United States Patent

[11] 3,545,807

| | | |
|---|---|---|
| [72] | Inventor | Constantin Graf Von Breckheim,<br>Friedrichstrasse 9, an der Bergstrasse,<br>Weinheim, Germany |
| [21] | Appl. No. | 822,283 |
| [22] | Filed | May 6, 1969 |
| [45] | Patented | Dec. 8, 1970 |
| [32] | Priority | May 7, 1968 |
| [33] | | Germany |
| [31] | | No. 1,755,419 |

[54] ELECTRODE ARRANGEMENT
12 Claims, 1 Drawing Fig.
[52] U.S. Cl. ................................................. 296/137,
296/1
[51] Int. Cl. ............................................... B60j 7/10
[50] Field of Search ............................................ 296/137;
52/222, 227; 160/214, 222, 224, 375, 376;
128/419

[56] References Cited
UNITED STATES PATENTS
2,239,318   4/1941   Haberstump ................. 296/137
FOREIGN PATENTS
1,063,293   8/1959   Germany ..................... 128/419

Primary Examiner—Benjamin Hersh
Assistant Examiner—Robert R. Song
Attorney—Michael S. Striker ABSTRACT: An electrode mounting arrangement for use in combination with a roof of airconditioned vehicles, including two spaced electrode carrying plates, each having opposed inner and outer edges, with the outer edges adapted to firmly engage oppositely spaced abutment means on the roof in response to pressure received from a spring arrangement located intermediate the plates and biassed against the inner edges thereof.

PATENTED DEC 8 1970

3,545,807

Inventor:

CONSTANTIN GRAF VON BERCKHEIM

By Michael Stuck
Attorney

ELECTRODE ARRANGEMENT

BACKGROUND OF THE INVENTION

The present invention relates to an electrode arrangement for use in combination with the interior roof of a motor vehicle equipped with airconditioning.

It is conventional to set up an electric field in the interior of a motor vehicle by connecting two electrodes to a source of high DC current. Usually, one of these electrodes is formed by the chassis of the vehicle while the second electrode is in the nature of an insulated roof electrode.

The main disadvantage encountered with such rooftype electrodes is that they require the provision of rather complex and special mounting means, e.g. screw mountings, in the vehicle in order to be positioned therein, with the result that such positioning as a rule can only be done by a specialist.

In addition, since the electrodes as such must correspond with the interior size and shape of the vehicle and since hitherto they were not adjustable, a great number of differently sized and shaped electrodes must be on hand to fit the different types of vehicles.

SUMMARY OF THE INVENTION

Consequently, the present invention has as its object to provide a simple electrode arrangement which is adapted to fit any type vehicle and may be easily installed without the help of an expert and without the necessity of complete mounting means and which, in addition, offers a considerable economy as far as its construction and manufacture is concerned.

According to the present invention, this is accomplished by the arrangement of two spaced electrode-carrying plates, each having opposed inner and outer edges, with the latter edges adapted to firmly engage oppositely and laterally spaced abutment means on the roof in response to pressure received from a spring arrangement which is biassed intermediate the plates and expands against the inner edges thereof.

The abutment means used for mounting the electrode may be in any suitable form and may have different configurations, however, they should be capable of supporting the outer abutment edges of the plates and able to withstand the lateral pressure by the plates resulting from the spring bias exerted thereon.

In one instance, for example, the outer abutment edges of the electrode-carrying plates may be toothed and the abutment means may be constituted by the interior side lining of the vehicle with which the teeth of the edges engage.

It is particularly advantageous to arrange and position the outer abutment edges of the plates in such a manner that upon installation in the vehicle, they abut against means which are positioned at the opposite transition surfaces between the roof and the side walls of the vehicle.

In fact, these abutment means, positioned as such, may already exist in the vehicle and may be in the form of an interior inwardly projected roof flange or may be the upper portion of a bead surrounding the door. If not present, such abutment means may easily be installed in that area, for example by means of an adhesive substance.

In a preferred embodiment of the invention each of the two plate sections is provided with individual spring members which engagingly abut against a common central support disposed intermediate the plate sections, in which manner a particularly symmetrical arrangement is obtained.

In addition, the outer distance of the two plate sections may be varied, i.e. widened or shortened, by adjusting the spring members which is done by means of screw members on the central support. In this fashion the spring arrangement is able to compensate for variations in width of different type vehicles so that one standard-type electrode arrangement can be used to equip a great number of differently sized vehicles.

Also, means are provided to guide these plate sections in the central support. This guidance preferably is done in such a way that upon mounting of the electrode arrangement in the vehicle, the lower planes of the two plate sections together form an angle of a little less than 180° while the two upper planes of these sections form an angle of a little more than 180°. In this manner a snap-fit condition is achieved for the electrode arrangement in that in this condition the outer edges of the plate sections are biassed against their respective lateral abutment means while the upper section of the central support is biassed against the roof, substantially centrally of the vehicle.

For beautification purposes and to effect an overall aesthetic arrangement, the central support is further provided with means to cover the gap between the two plate sections.

The plate sections may be made of metal and, as such, may constitute the electrode. However, as an alternative, the plate sections may also be made of any other suitable material and function as support plates and be provided with electrode-forming metal layers.

These and other objects, features and advantages of the present invention will become more obvious from the following description when taken in consideration with the accompanying drawings which show, for purposes of illustration only, a preferred embodiment in accordance with the present invention.

DESCRIPTION OF THE PREFERRED EMBODIMENTS

Figure 1:
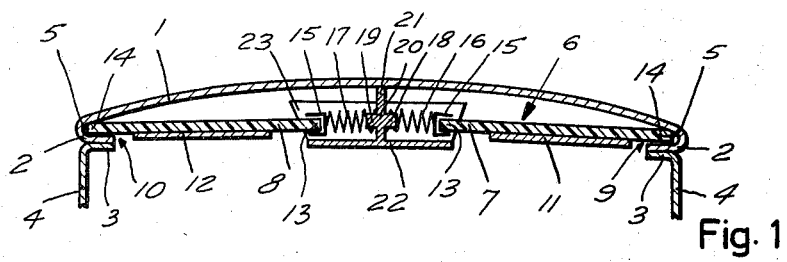
FIG. 1 shows a schematic cross-sectional view of a motor vehicle roof and an electrode arrangement mounted thereon in accordance with the present invention.
Figure 2:
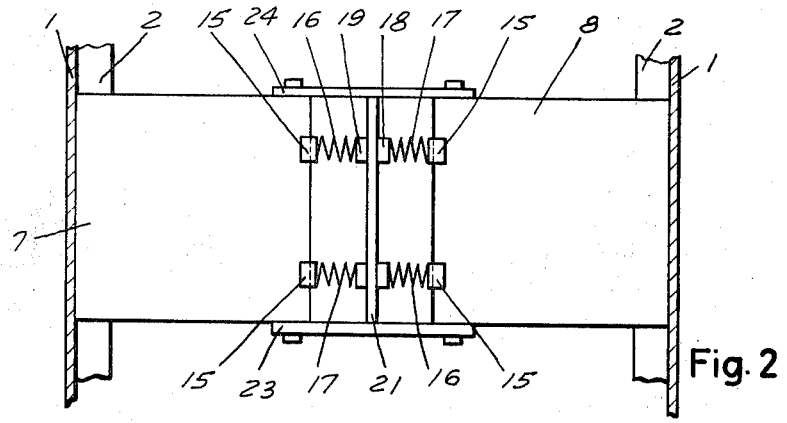
FIG. 2 shows a top view of the electrode arrangement of FIG. 1.

In the embodiment shown in FIGS. 1 and 2, a vehicle roof 1 is formed with oppositely spaced interior flange projections 2 which rest upon corresponding interior wall projections 3 formed at the uppermost ends 4 of the sidewalls of a vehicle. As shown, the roof projections 2 are inwardly directed from the outer curved ends of the roof and constitute substantially concave sections 5 therewith.

An electrode arrangement, generally indicated at 6, is mounted directly beneath the roof and is seen to comprise two substantially rectangular plate sections 7 and 8 which, at their lower surfaces 9 and 10, are arranged with and carry metal layers 11 and 12 which constitute the actual electrodes of the electrode arrangement. The two plate sections, made of a suitable insulating material, are spaced relative to one another and have opposite inner and outer edges 13 and 14, respectively. Disposed intermediate the plate sections 7 and 8 and fastened to and abutting against the inner edges 13 with their outer ends via clamps 15, are pressure springs 16 and 17. Springs 16 and 17, at their inner ends and via spring supports 18 and 19, abut against a central support 20 which extends axially between the inner edges 13 of the two plate sections. As shown, spring supports 18 and 19 project laterally from central support 20 and are integrally formed therewith. It will be understood that with this particular mounting fashion, the springs are biassed between the central support 20 and the inner edges 13 of the plates, thereby biassing the plates away from each other and away from the central support 20, as a result of which the outer edges 14 are brought into engaging abutment with the concavities 5 and which outer edges at the same time are anchored behind the roof projections 2. In this condition, the plate sections are, so to speak, snapped into position and preferably from an angle of a little less than 180° in which position the upper section 21 of central support 20 rests against the roof and forms a stabilizing medium.

Figure 3:
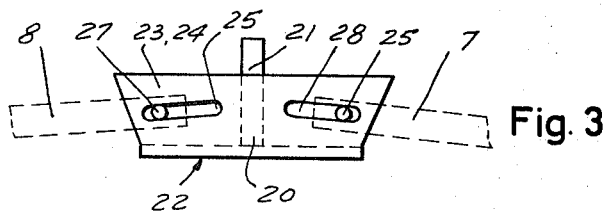
FIG. 3 shows a side view of the central support incorporated in the electrode arrangement of FIG. 1.

As shown in FIG. 3, the central support 20 further comprises at its lower end a cover plate 22 which, for beautification purposes and with the plate sections in position, covers the gap intermediate the plate sections.

Also, central support 20 is provided with two end plates or side walls 23 and 24 which are formed with guides 25 and 26, in the form of elongated slots, and which serve to guide pins 27 and 28 laterally projecting from the front and rear faces of the plate sections, so as to enable these plate sections to be properly positioned.

In this manner and in assembly, both plate sections are shifted inwardly against the spring bias, with pins 27 and 28 being guided in slots 25 and 26. Upon release or expansion of the springs, outer edges 14, due to pressure, automatically engage concavities 5 and are held and secured in the position as shown in FIG. 1.

Figure 4:
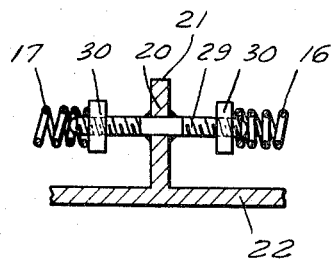
FIG. 4 shows a partial cross-sectional view of a modification of the central support shown in FIG. 3.

FIG. 4 shows a further embodiment of the central support 20, which in this instance is provided with two thread bolts 29, which are welded thereto and which comprise two nuts 30 against which the springs 16 and 17 abut. By screwing these nuts in or out, the outer distance of the plate sections as well as the spring pressure may be varied. Thread bolts 29, serving as a substitute for the spring supports 18 and 19 of FIG. 1, enables various sized vehicles to be equipped with a standard-type electrode arrangement simply by varying the outer distance of the plate sections by means of the combination of the thread bolts 29 and nuts 30.

Figure 5:
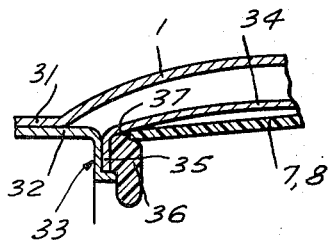
FIG. 5 shows a fragmental cross-sectional view of a modification of the electrode mounting arrangement shown in FIG. 1.

FIG. 5 shows a further mounting construction of the electrode arrangement and in which the vehicle roof 1 is formed with an exterior lateral roof projection 31 which rests upon an exterior wall projection 32, formed at the uppermost end 33 of the side wall of the vehicle. The upper car interior 34, in this instance, is arranged so that its outermost edges, formed into downward projections 35, rest upon an interior ridge extension 36 of outer wall projection 32 and are held in position by an interior bead 36. Formed at the upper end of bead 36 is an inwardly curved indent 37 which serves as an abutment for the outer edges 14 of plate sections 7 and 8.

The embodiment shown may be modified in various manners without departing from the basic principle of the invention. For example, the pressure springs may be substituted by tension springs, which via a lever mechanism, exert a compressive force on the plate sections.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

I claim:

1. An electrode arrangement for vehicles including a roof and side walls, said arrangement comprising, in combination, two spaced oppositely arranged abutment means on said roof downwardly projecting therefrom; two electrode-carrying plates, each of said electrode-carrying plates having oppositely arranged outer and inner edges and each abutting with its outer edge against one of said abutment means so that said inner edges of said electrode-carrying plates are located spaced from and facing each other under said roof; and a biassing arrangement arranged between said inner edges of said electrode-carrying plates resiliently abutting against the same and biassing them away from each other whereby the outer edges of said electrode-carrying plates are firmly held against the corresponding abutment means.

2. An electrode arrangement according to claim 1, wherein said biassing means includes at least one pressure spring means biassed intermediate said inner edges of said electrode-carrying plates.

3. An electrode arrangement according to claim 2, wherein said biassing arrangement further includes clamps for fastening said biassing means to said inner edges of said plates.

4. An electrode arrangement according to claim 2, wherein said biassing arrangement includes two springs and a stabilizing support intermediate the facing ends of said two springs.

5. An electrode arrangement according to claim 4, wherein said stabilizing support is an elongated bar extending centrally and axially between said electrode-carrying plates and includes laterally projecting spring supports for engaging said facing ends of said springs.

6. An electrode arrangement according to claim 5, wherein said spring supports are threaded bolts provided with corresponding nuts, the latter adapted to engage said facing ends of said springs and adapted to be threaded along said threaded bolts to vary the distance of said support plates and to vary the pressure of said springs.

7. An electrode arrangement according to claim 1, wherein said electrode-carrying plates are substantially rectangular.

8. An electrode arrangement according to claim 1, wherein said abutment means consists of lateral depressions in said side walls, directly beneath the roof.

9. An electrode arrangement according to claim 1, wherein said abutment means consists of a bead extending along the side wall of the vehicle, directly adjacent the roof.

10. An electrode arrangement according to claim 1, wherein said outer edges of said plates are tooth-shaped and said abutment means are formed by the interior lining of the vehicle, adjacent the roof.

11. An electrode arrangement according to claim 4, wherein said stabilizing support includes positioning means for maintaining the inner edges of said plates at a higher level than the outer edges thereof so that the electrode-carrying plates form an angle of slightly less than 180° with each other whereby said plates are maintained to operative position by said biassing means with their inner edges freely movable against the action of said biassing means in downward direction.

12. An electrode arrangement according to claim 11, wherein said positioning means for maintaining said inner edges of said plates at a higher level consists of elongated slots formed in side plates of said stabilizing support and arranged to movably engage side pins projecting from said electrode-carrying plates, adjacent said inner edges.